(12) United States Patent
Cho et al.

(10) Patent No.: US 12,549,705 B2
(45) Date of Patent: Feb. 10, 2026

(54) SYSTEMS AND METHODS FOR PROBABILITY MODEL SWITCHING

(71) Applicant: Tencent America LLC, Palo Alto, CA (US)

(72) Inventors: Yushin Cho, Palo Alto, CA (US); Xin Zhao, Palo Alto, CA (US); Madhu Peringassery Krishnan, Palo Alto, CA (US); Liang Zhao, Palo Alto, CA (US); Jing Ye, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/677,745

(22) Filed: May 29, 2024

(65) Prior Publication Data

US 2025/0142048 A1    May 1, 2025

Related U.S. Application Data

(60) Provisional application No. 63/546,486, filed on Oct. 30, 2023.

(51) Int. Cl.
*H04N 19/102* (2014.01)
*H04N 19/147* (2014.01)
(Continued)

(52) U.S. Cl.
CPC ......... *H04N 19/102* (2014.11); *H04N 19/147* (2014.11); *H04N 19/159* (2014.11);
(Continued)

(58) Field of Classification Search
CPC .. H04N 19/102; H04N 19/147; H04N 19/159; H04N 19/176; H04N 19/60;
(Continued)

(56) References Cited

U.S. PATENT DOCUMENTS

2012/0081241 A1    4/2012 Misra et al.
2021/0195198 A1*   6/2021 Chen ................. H04N 19/54
(Continued)

OTHER PUBLICATIONS

Yushin Cho et al., "Explicit Signaling of Secondary Transform Set", Alliance for Open Media, Codec Working Group, Document: CWG-D096_v6, Sep. 2023, 5 pgs.
(Continued)

*Primary Examiner* — Susan E. Hodges
(74) *Attorney, Agent, or Firm* — Morgan, Lewis & Bockius LLP

(57) ABSTRACT

The various implementations described herein include methods and systems for coding video. In one aspect, a method includes receiving a video bitstream comprising a set of encoded video information and a first indicator associated with a plurality of probability models. The method includes determining a value of the first indicator by parsing the video bitstream. The method includes, when the first indicator has a first value, selecting a first probability model from the plurality of probability models and when the first indicator has a second value, selecting a second probability model from the plurality of probability models, the second probability model being different from the first probability model. The method also includes entropy decoding the set of encoded video information using the selected probability model.

20 Claims, 7 Drawing Sheets

(51) Int. Cl.
*H04N 19/159* (2014.01)
*H04N 19/176* (2014.01)
*H04N 19/60* (2014.01)
*H04N 19/70* (2014.01)
*H04N 19/91* (2014.01)

(52) U.S. Cl.
CPC ........... *H04N 19/176* (2014.11); *H04N 19/60* (2014.11); *H04N 19/70* (2014.11); *H04N 19/91* (2014.11)

(58) Field of Classification Search
CPC ........ H04N 19/70; H04N 19/91; H04N 19/12; H04N 19/13
USPC ........................................................ 375/240
See application file for complete search history.

(56) References Cited

U.S. PATENT DOCUMENTS

2022/0417529 A1* 12/2022 Zhang .................... H04N 19/12
2023/0247206 A1* 8/2023 Peringassery Krishnan ................ H04N 19/149 375/240.02
2023/0291905 A1 9/2023 Peringassery Krishnan et al.

OTHER PUBLICATIONS

Yushin Cho et al., "R-D Optimized IST Set Selection", Alliance for Open Media, Codec Working Group, Document: CWG-D159-v3, Nov. 2023, 3 pgs.
Tencent America LLC, ISR/WO, PCT/US2024/032078, Aug. 27, 2024, 14 pgs.
Peter de Rivaz et al., "AV1 Bitstream & Decoding Process Specification", The Alliance for Open Media, Jan. 2019, 681 pgs. Retrieved from the Internet: https://aomediacodec.github.io/av1-spec/av1-spec.pdf.

* cited by examiner

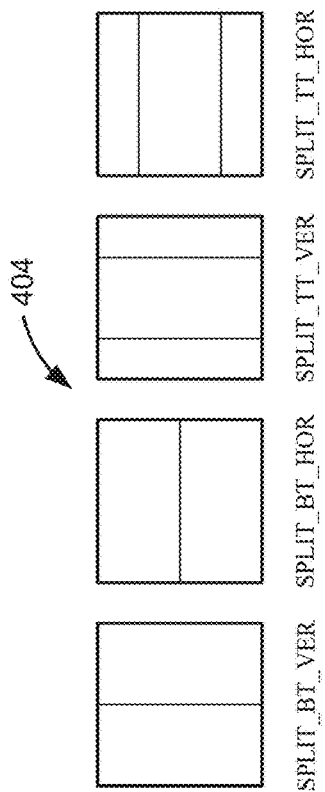
FIG. 4C
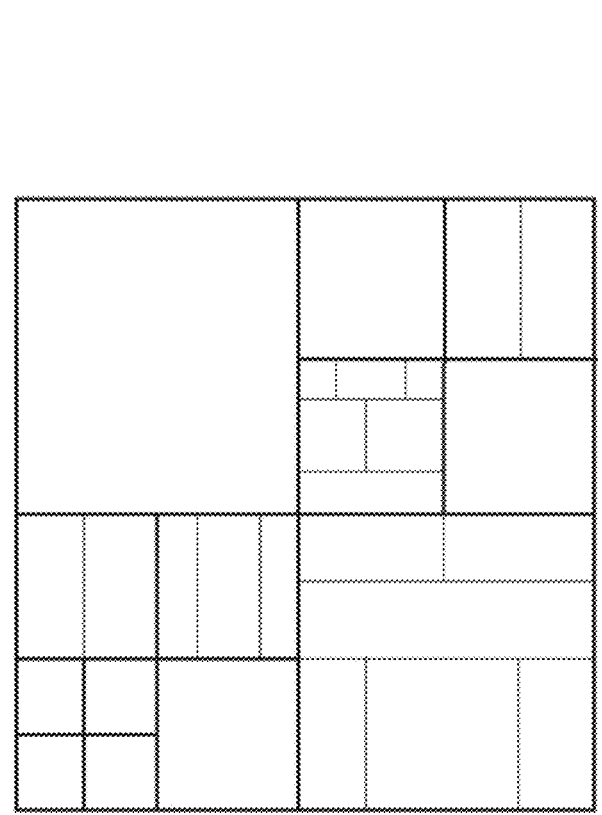
FIG. 4D
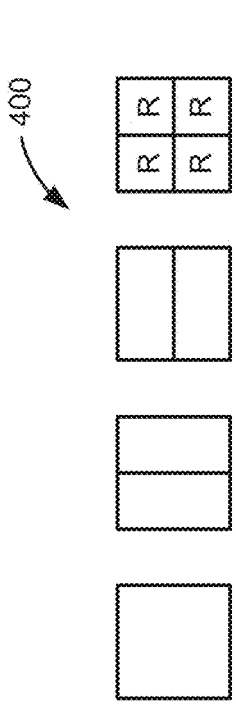
FIG. 4A
FIG. 4B

SYSTEMS AND METHODS FOR PROBABILITY MODEL SWITCHING

RELATED APPLICATIONS

This application claims priority to U.S. Provisional Patent Application No. 63/546,486, entitled "Probability Model Switching," filed Oct. 30, 2023, which is hereby incorporated by reference in its entirety.

TECHNICAL FIELD

The disclosed embodiments relate generally to video coding, including but not limited to systems and methods for switching probability models.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes a set of methods for video (image) compression, including methods for switching probability models when entropy encoding data for a video bitstream. In an example, a video bitstream may include a first indicator associated with a plurality of probability models. When the first indicator has a first value, a first probability model is selected, and when the first indicator has a second value, a second probability model is selected. Video information encoded in the video bitstream is entropy decoded using the selected probability model. In some embodiments, the probability models are represented as cumulative density functions (CDFs) for an arithmetic coding. In some embodiments, a probability model is chosen depending on the intra prediction mode. The switching of a probability model of entropy coding can be explicitly signaled in the bitstream or implicitly derived at both encoder and decoder, such that the decoder will either receive the signaled switching or implicitly derive the switching to apply the same probability model as applied by the encoder. Switching between probability models allows for more efficient entropy encoding, which can reduce signaling overhead and computational costs. Signaling the probability model allows for the most suitable probability model to be used, which increases the efficiency of the entropy encoding.

In accordance with some embodiments, a method of video decoding includes (i) receiving a video bitstream comprising a set of encoded video information and a first indicator associated with a plurality of probability models; (ii) determining a value of the first indicator (e.g., a first syntax element or first flag) by parsing the video bitstream; (iii) when the first indicator has a first value, selecting a first probability model from the plurality of probability models; (iv) when the first indicator has a second value, selecting a second probability model from the plurality of probability models, the second probability model being different from the first probability model; and (v) entropy decoding the set of encoded video information using the selected probability model.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 4A-4D illustrate example coding tree structures in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes a set of methods for video (image) compression, including methods for switching probability models. For example, a different probability model (e.g., represented as a CDF) may be chosen depending on the intra prediction mode. As an example for transform coding, the probability model for each context may be designed such that the arithmetic coder spends as small as possible number of bits for each of seven secondary transform set indices. The switching of a probability model for entropy coding can be explicitly signaled in the bitstream or implicitly derived at both encoder and decoder, such that the decoder will either receive the signaled switching or implicitly derive the switching to apply the same probability model as applied by the encoder. Switching probability models can improve coding efficiency (e.g., optimizing entropy encoding and thereby using less bits to encode and signal data). Additionally, signaling which probability model to use can further improve coding efficiency (e.g., the decoder does not need to derive which model to use and can apply the most appropriate model for each block/component).

Example Systems and Devices

Figure 1:
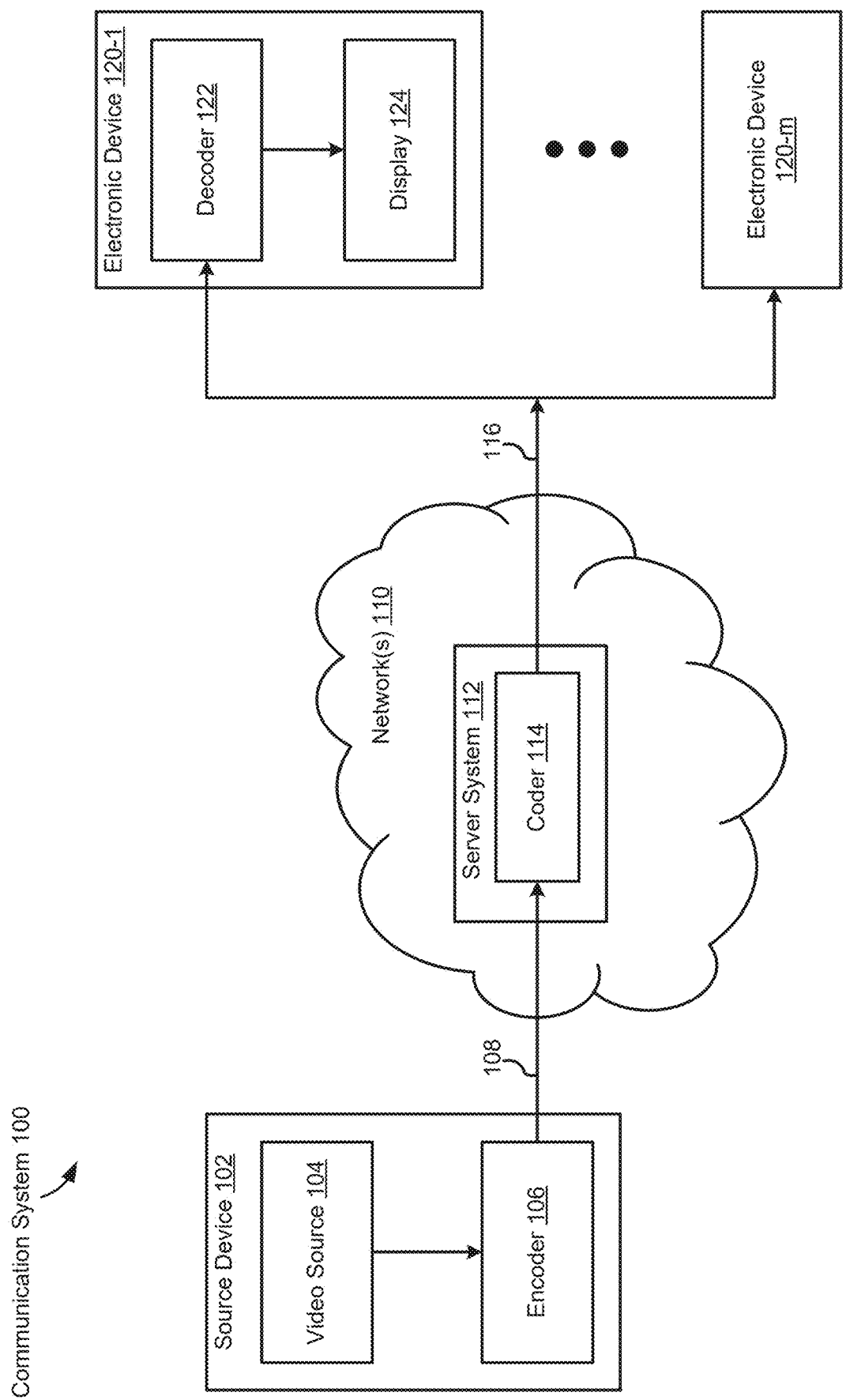
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106.

Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including, e.g., wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
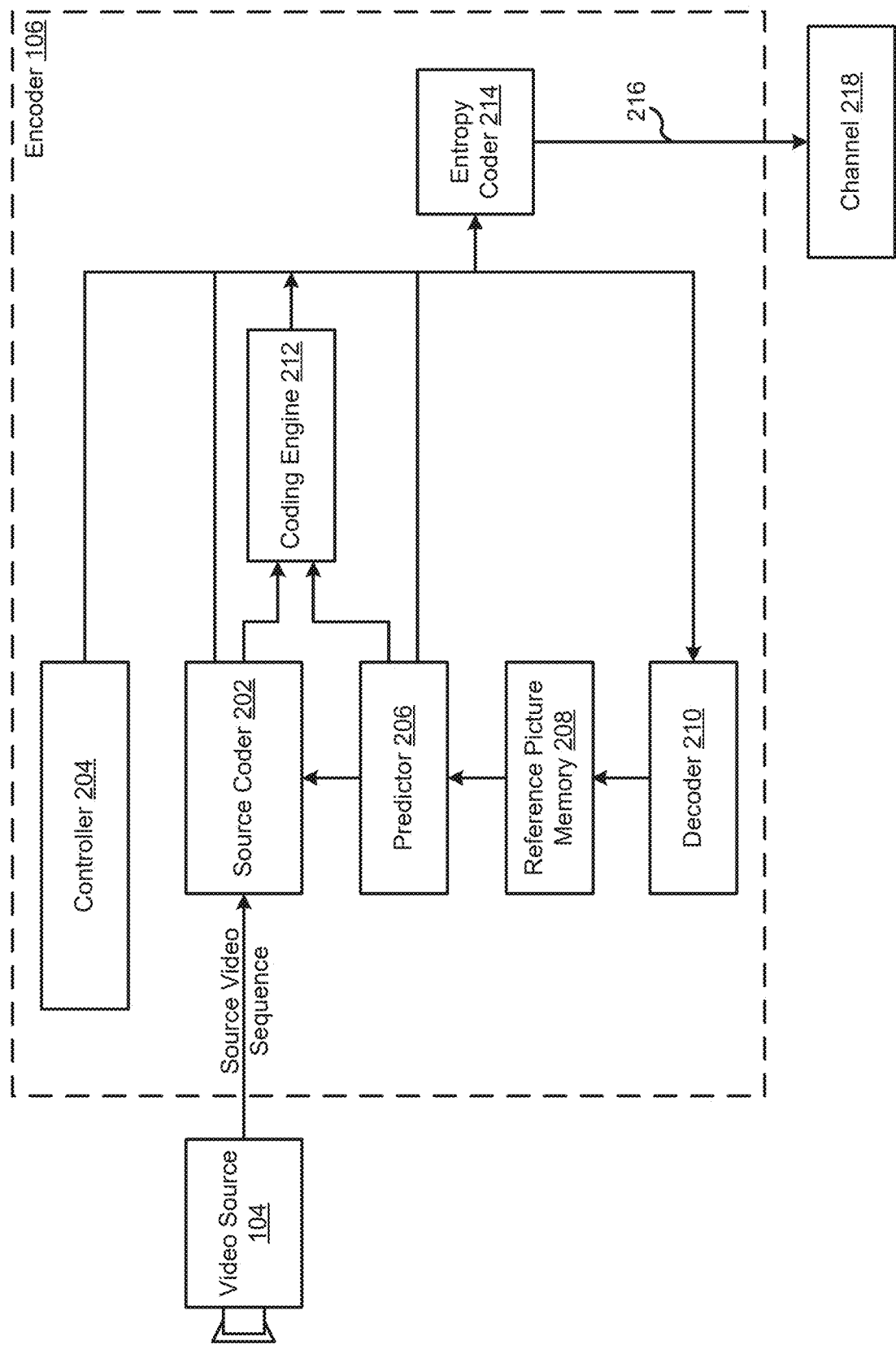
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, e.g., setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
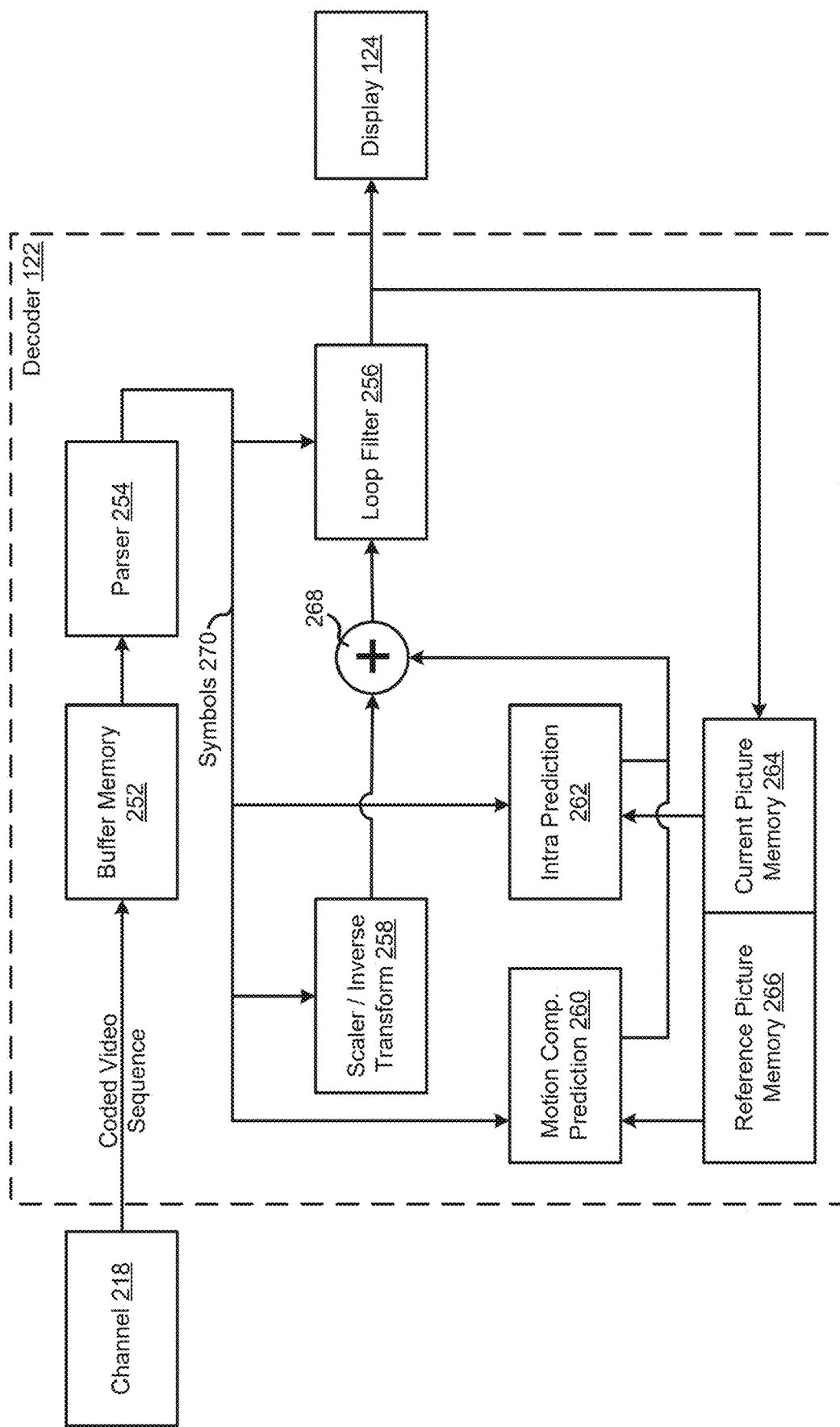
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, e.g., coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, e.g., information used to manage operation of the decoder component 122, and/or information to control a rendering device such as the display 124. The control information for the rendering device(s) may be in the form of, e.g., Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, e.g., X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (e.g., by parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. Levels may restrict the maximum picture size, maximum frame rate, maximum reconstruction sample rate (measured in, e.g., megasamples per second), maximum reference picture size, and so on. Limits set by levels may be further restricted through Hypothetical Reference Decoder (HRD) specifications and metadata for HRD buffer management signaled in the coded video sequence.

Figure 3:
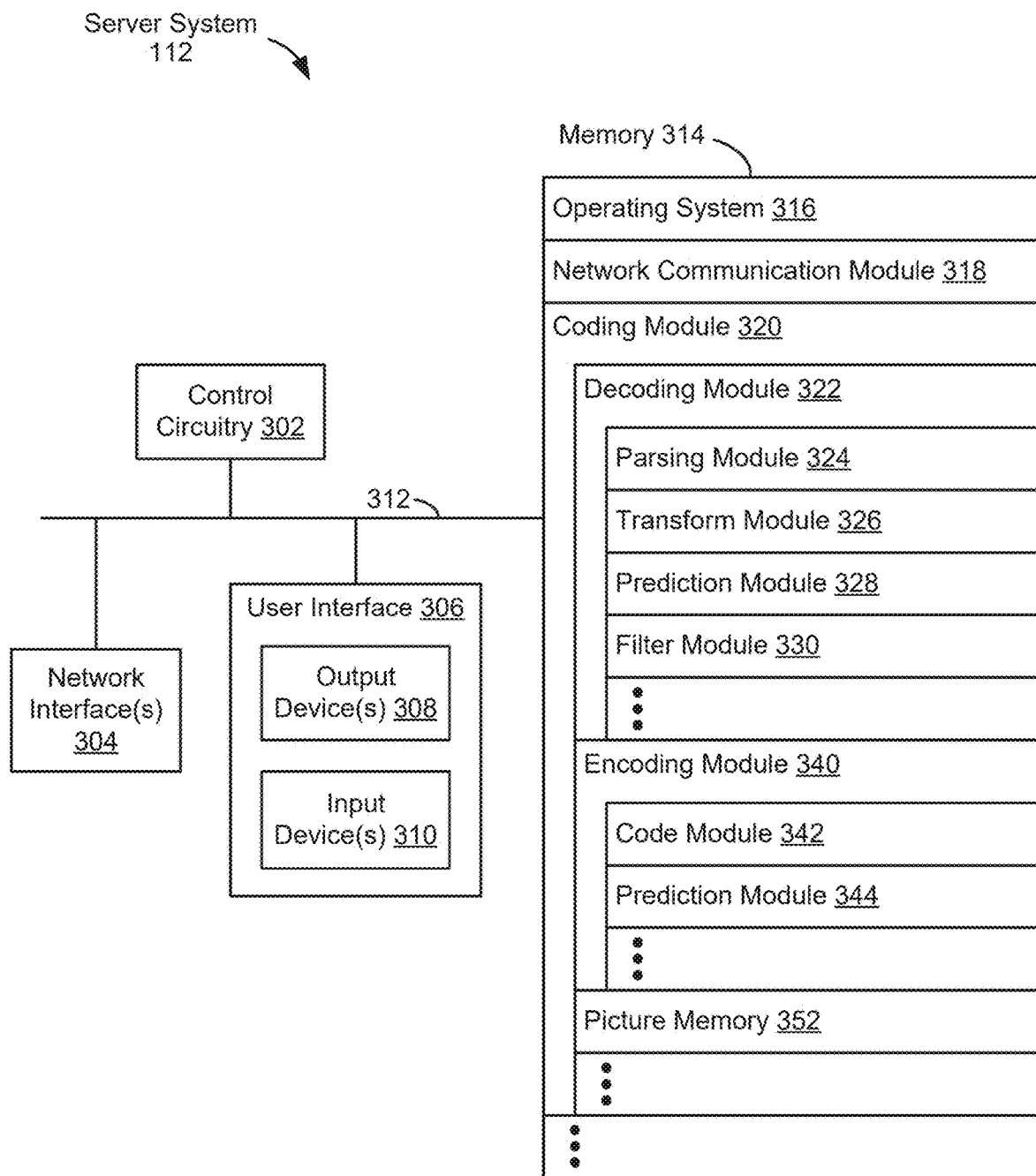
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120).

As mentioned previously, the present disclosure covers entropy encoding and probability model switching. Entropy coding in video codecs uses context-based (e.g., conditional) probabilities so that the symbols can be coded with one or more probability models that can best capture the statistics governed by a condition or higher order conditions. Some embodiments of the present disclosure describe switching a probability model for entropy coding. The switching of the probability model may be explicitly signaled in the bitstream or implicitly derived at both encoder and decoder. Cumulative Distribution Functions (CDFs) are example probability models used by arithmetic coding. In some embodiments of the present disclosure, CDFs are implemented or adapted for use in entropy coding adopted by video compression.

In the following, the term "probability model" refers to any aspect about deriving the probability of a symbol during entropy coding, which is used to determine the output of a context-based arithmetic coding engine. Examples of design aspects of probability model can include the context initialization probability/state, probability update window size/speed, context derivation process, number of contexts, number of windows, or codewords. The term "block" may refer to a coding tree block, the largest coding block, a predefined fixed block size, coding block, prediction block, residual block or transform block. A secondary transform refers to a transform process applied on the transform coefficient block produced by a primary transform. In some embodiments, the secondary transform is applied only on partial(s) of the transform coefficient block, e.g., the lower frequency transform coefficients.

In some embodiments, a default mode is encoded without performing a search for a better mode decision (e.g., a more coding efficient decision). The default mode may be used when an encoder does not have enough computing power to perform the search and/or determine a better mode. The probability model option to encode this default mode can be designed so that it can best encode the default mode.

In some embodiments, the switching or adaption of a probability model can occur at any place in the middle of encoding and/or decoding, e.g., at the beginning of a sequence, at the beginning of a group of pictures (GOP), at the beginning of a frame, for each coding block, for each partition, for each transform block, etc.

Turning to block partitioning, FIGS. 4A-4D illustrate example coding tree structures in accordance with some embodiments. As shown in a first coding tree structure (400) in FIG. 4A, some coding approaches use a 4-way partition tree starting from a 64×64 level down to a 4×4 level, e.g., with some additional restrictions for blocks 8×8. In FIG. 4A, partitions designated as "R" are recursive in that the same partition tree is repeated at a lower scale until the lowest level is reached. As shown in the example coding tree structure (402) in FIG. 4B, some coding approaches expand the partition tree to a 10-way structure and increase the largest size (e.g., sometimes referred to as a superblock) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a coding tree unit (CTU) may be split into coding units (CUs) by using a quad-tree structure denoted as a coding tree to adapt to various local characteristics. In some embodiments, the decision on whether to code a picture area using inter-picture (temporal) or intra-picture (spatial) prediction is made at the CU level. Each CU can be further split into one, two, or four prediction units (PUs) according to the PU splitting type. Inside a PU, the same prediction process is applied, and the relevant information may be transmitted to the decoder on a PU basis. After obtaining the residual block by applying the prediction process based on the PU splitting type, a CU can be partitioned into transform units (TUs) according to another quad-tree structure like the coding tree for the CU.

A quad-tree with nested multi-type tree using binary and ternary splits segmentation structure may be used to replace the concepts of multiple partition unit types. In the coding tree structure, a CU can have either a square or rectangular shape. A CTU is first partitioned by a quaternary tree structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length. This means that, the CU, PU, and TU may have the same block size in the quad-tree with a nested multi-type tree coding block structure. An example of block partitions for one CTU (406) is shown in FIG. 4D, which illustrates an example quadtree.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

Turning now to transforms and transform blocks, multiple transform sizes (e.g., ranging from 4-point to 64-point for each dimension) and transform shapes (e.g., square or rectangular with width/height ratio's 2:1/1:2 and 4:1/1:4) may be utilized. Notably, while the encoder component applies transforms, the decoder component performs the inverse transforms. Thus, in the description below, transforms described in the context of the decoder component may be the inverse of the transforms applied on the encoder side.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point discrete cosine transform DCT-2; b) 4-point, 8-point, 16-point asymmetric discrete sine transforms (DST-4, DST-7) and their flipped versions; or c) 4-point, 8-point, 16-point, 32-point identity transforms. The basis functions for the DCT-2 and asymmetric DSTs, such as used in AV1, are listed in Table 1.

TABLE 1

Example Primary Transform Basis Functions

| Transform Type | Basis function $T_i(j)$, $i, j = 0, 1, \ldots, N-1$ |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ |

TABLE 1-continued

Example Primary Transform Basis Functions

| Transform Type | Basis function $T_i(j)$, i, j = 0, 1, ..., N − 1 |
|---|---|
| DST-4 | where $\omega_0 = \begin{cases} \sqrt{\dfrac{2}{N}} & i = 0 \\ 1 & i \neq 0 \end{cases}$ $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |
| IDTX | $T_i(j) = (i == j)? \ 1:0$ |

The availability of hybrid transform kernels may be based on the transform block size and prediction mode. Example dependencies are listed in Table 2 below, where "→" and "↓" denote the horizontal and vertical dimensions, and "✓" and "x" denote the availability of a kernel for that block size and prediction mode. IDTX (or IDT) stands for identity transform.

TABLE 2

Availability of Hybrid Transform Kernels

| | | Prediction mode | |
|---|---|---|---|
| Transform Types | Description | Intra | Inter |
| DCT_DCT | DCT ↓ and → | ✓ (all block sizes) | ✓ (all block sizes) |
| ADST_DCT | ADST ↓; DCT → | ✓ (block size ≤ 16 × 16) | ✓ (block size ≤ 16 × 16) |
| DCT_ADST | DCT ↓; ADST → | | |
| ADST_ADST | ADST ↓ and → | | |
| FLIPADST_DCT | FLIPADST ↓; DCT → | x | ✓ (block size ≤ 16 × 16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16 × 16) | ✓ (block size ≤ 32 × 32) |
| V_DCT | DCT ↓; IDTX → | ✓ (block size < 16 × 16) | ✓ (block size ≤ 16 × 16) |
| H_DCT | IDTX ↓; DCT → | | |
| V_ADST | ADST ↓; IDTX → | x | ✓ (block size < 16 × 16) |
| H_ADST | IDTX ↓; ADST → | | |
| V_FLIPADST | FLIPADST ↓; IDTX → | x | ✓ (block size < 16 × 16) |
| H_FLIPADST | IDTX ↓; FLIPADST → | | |

For a chroma component, the transform type selection may be performed in an implicit way. For intra prediction residuals, the transform type may be selected according to the intra prediction mode, e.g., as specified in Table 3. For inter prediction residuals, the transform type may be selected according to the transform type selection of the co-located luma block. Thus, for a chroma component, no transform type signaling may be needed.

TABLE 3

Transform Type Selection for Chroma Intra Prediction Residuals

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Figure 5A:
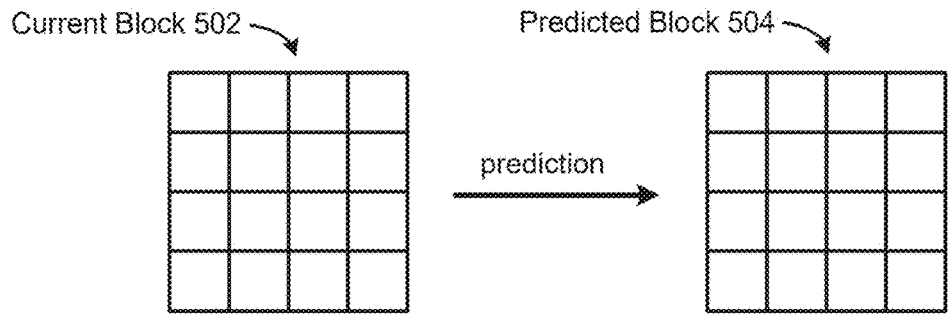
FIGS. 5A-5C illustrate example prediction blocks, residual blocks, and reconstructed blocks according to some embodiments.
Figure 5B:
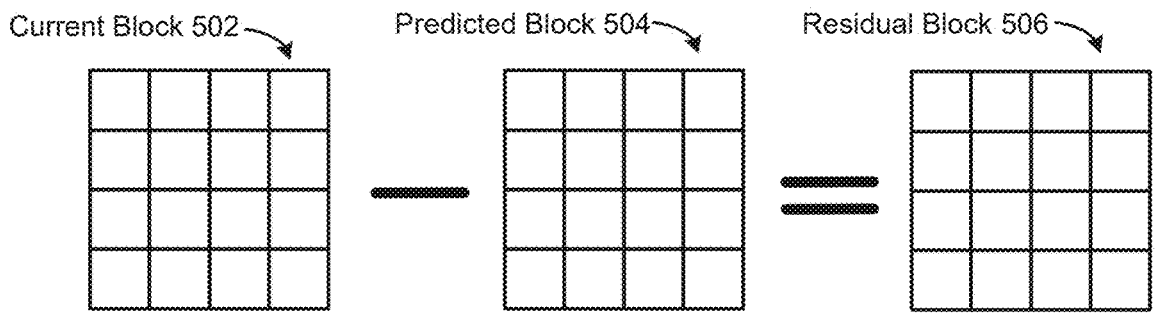
Figure 5C:
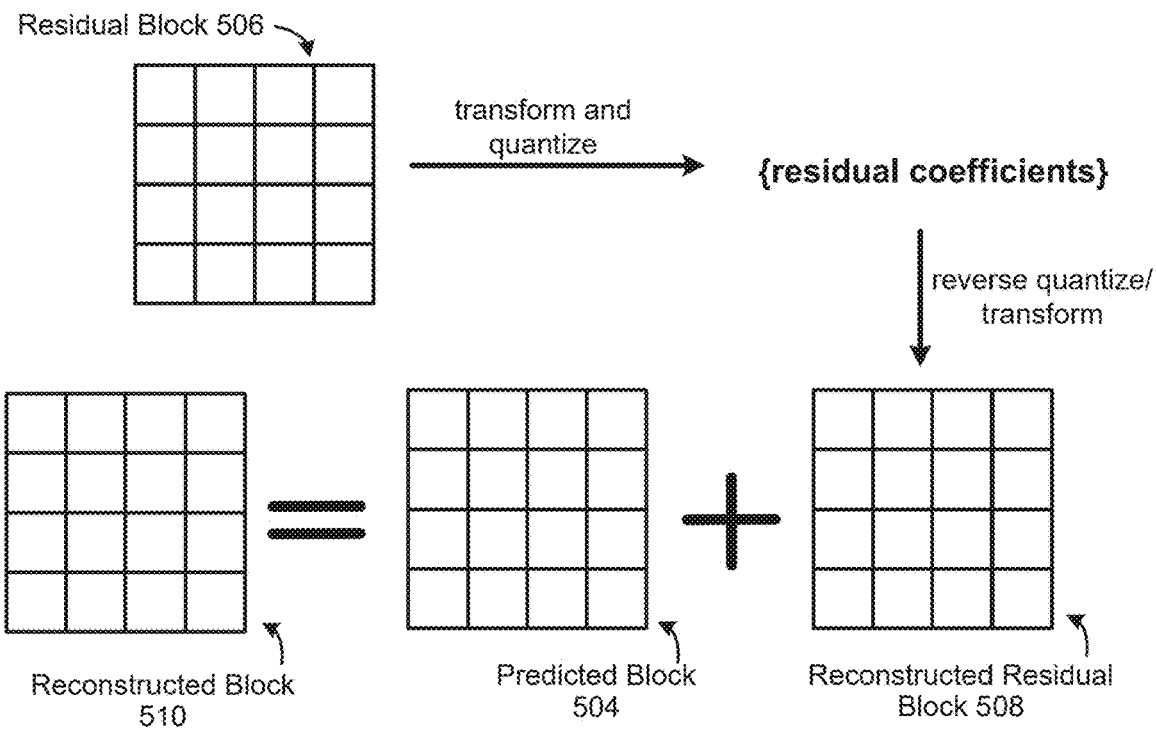

Turning now to example encoding and decoding using prediction and residual blocks, FIG. 5A illustrates the computation of a prediction block in accordance with some embodiments. In the example of FIG. 5A, an intra prediction is performed on a current block 502 to generate a predicted block 504. In some embodiments, an inter prediction is performed to generate the predicted block. The current block 502 includes a set of samples (e.g., pixel blocks) and the prediction block 504 includes a set of predictions that correspond to the set of samples. FIG. 5B illustrates the computation of a residual block in accordance with some embodiments. As shown in FIG. 5B, the prediction block 504 is subtracted from the current block 502 to generate a residual block 506 that includes a set of residues. For example, respective differences are calculated between each sample and the corresponding prediction. FIG. 5C illustrates the computation of a reconstructed block in accordance with some embodiments. As shown in FIG. 5C, the residual block 506 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residual block 508. The reconstructed residual block 508 is combined with the predicted block 504 (e.g., reconstructed residues of the reconstructed residual block 508 are added to predictions of the prediction block 504) to generate a reconstructed block 510 corresponding to the current block 502.

In some embodiments, separable transforms, such as those shown in Table 1, are applied on intra residual and inter residual samples. In some embodiments, an intra secondary transform (IST) scheme is customized for a video coding library (e.g., used for transforming intra residual blocks). The IST scheme can efficiently capture directional patterns in intra residual samples with lower complexity compared to non-separable primary transforms. In an IST scheme the nominal intra prediction angles can be used to categorize the IST kernels.

Intra residual samples can present arbitrary directed texture patterns that can be more efficiently captured by non-separable transforms. However, the use of non-separable transforms for larger block sizes is limited due to complexities in their implementations. A non-separable secondary transform scheme that can capture most of the directionality, but with lower complexity due to its application on only the low frequency coefficients of the separable primary transform, can be applied to larger block sizes with less complexity.

In some embodiments, the IST scheme is incorporated on top of an intra prediction scheme. The IST scheme can include 12 sets of secondary transforms, with 3 kernels in each set. Table 4 shows an example secondary transform set selection and the corresponding indices used for transform set selection. The left column indicates the intra prediction modes with available transform kernels and the right column row indicates the set index. For example, at the encoder, for each mode, the best kernel from the set is selected based on a rate distortion optimization (RDO) and signaled (4 symbols, including no IST). In this example, at the decoder, the bitstream is parsed to get the kernel used.

TABLE 4

Secondary transform set selection

| Intra prediction | Set index |
| --- | --- |
| DC_PRED | 0 |
| V_PRED | 1 |
| H_PRED | 2 |
| D45_PRED | 3 |
| D135_PRED | 4 |
| D113_PRED | 5 |
| D157_PRED | 6 |
| D203_PRED | 7 |
| D67_PRED | 8 |
| SMOOTH_PRED | 9 |
| SMOOTH_V_PRED | 10 |
| SMOOTH_H_PRED | 11 |

In some embodiments, the secondary transform set is derived based on the intra prediction directions and the kernel type within a set is explicitly signaled. In some embodiments, the IST is enabled when either DCT-2 or ADST is used as both the horizontal and vertical primary transforms. In some embodiments, the IST is enabled only for luma intra blocks. For example, according to the block size, a 4×4 non-separable transform or 8×8 non-separable transform can be selected. If min (tx_width, tx_height)<8 the 4×4 IST can be selected. For larger blocks with both tx_width and tx_height being greater than or equal to 8, 8×8 IST can be used. Here tx_width and tx_height correspond to the transform block width and height respectively. The input to the IST may be low frequency primary transform coefficients in a zig-zag scan order, which may be the default scan order. This helps to achieve more efficient decorrelation of neighboring low frequency coefficients.

In some embodiments, both intra and inter coded blocks can be further partitioned into multiple transform units (e.g., with a partitioning depth up to 2 levels). In some embodiments, application of IST is limited to the root (depth 0) of the transform partitioning tree structure. A decrease in the overall encoding time complexity (~50%) with minimal impact in compression efficiency (~0.25% loss) may be achieved by this limitation. In some embodiments using the IST scheme, a square transform block size is utilized to derive the context information, and thereby the contexts, to be used for entropy coding the kernel index. For rectangular transform blocks, the next smallest square size may be utilized.

In some embodiments, an IST scheme defines 14 sets of secondary transforms, with 3 kernels in each set. The IST set selection may depend on the intra prediction mode employed for residual generation. Table 5 below describes the mapping between intra prediction modes, a primary transform type, and an IST set index. The first column indicates the intra prediction modes with available kernels, the second indicates primary transform type and the third indicates the set index. According to the block size, a 16-point or 64-point IST may be selected. If min (tx_width, tx_height)<8, the 16-point IST can be selected. For larger blocks with both tx_width and tx_height being greater than or equal to 8, the 64-point IST may be used. Here tx_width and tx_height correspond to transform block width and height respectively. The transform coefficients outside the region of application (RoA) of IST (primary only transform coefficients) may be zeroed out.

TABLE 5

Secondary transform set selection

| Intra nominal mode | Primary transform type | IST set index |
| --- | --- | --- |
| DC_PRED | DCT Only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOTH_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOTH_H | | 8 |

Table 5 illustrates an example mapping of intra modes to IST kernel sets. In some embodiments, an IST kernel mapping array (e.g., denoted as "stx_transpose_mapping") uses at least a portion of the mapping shown in Table 5 (e.g., the DCT Onl portion). In Table 5, the 14 secondary transform sets are dependent on two primary transform types, DCT_DCT and ADST_ADST. Hence, only 7 different sets need be signaled for one primary transform type. In some embodiments, the probabilistic context selected for each set is derived from the intra prediction modes.

In some embodiments, an encoder component chooses the IST set implicitly based on a predefined mapping between intra prediction modes and IST sets. Some embodiments use an additional RDO-based search loop to choose the best IST set index. In some embodiments, the encoder performs an additional search on all the available IST sets (e.g., instead of checking only one IST set depending on the intra prediction mode), so that the encoder can make rate-distortion optimized decisions on the selection of IST set. The IST kernels and default CDFs are both retrained.

In some embodiments, the IST scheme is enabled by default. The IST scheme implicitly derives the secondary transform set based on the context of intra prediction directions and explicitly signals the kernel type within a set.

Some embodiments disclose an adaptive secondary transform scheme where the secondary transform set is signaled explicitly, such that any secondary transform set can be selected for a block regardless of the intra prediction mode being applied. The secondary transform kernel selection is no longer mode dependent and more flexibility is allowed for transform set selection. In this way, in some embodiments, the set index for the secondary transform is not implicitly derived on the decoder side. Instead, the intra prediction modes are used as the context when entropy coding the set index.

In some embodiments, a different probability model (represented as CDF for an arithmetic coding) is chosen depending on the intra prediction mode. The probability model for each context is designed such that the arithmetic coder spends as small as possible number of bits for each of seven secondary transform set indices. Example Code 1 shows syntax elements in transform type syntax for IST, in accordance with some embodiments. In this example, stx_set is a syntax element in the transform type syntax that explicitly signals the secondary transform set. In some embodiments, stx_set is only signaled when stx_type is not zero (e.g., only when a secondary transform is used).

| | Type |
|---|---|
| transform_type( x4, y4, txSz) { <br> ... <br> } else { <br> intra_tx_type <br> if ( set == TX_SET_INTRA_1 ) <br>   TxType = Tx_Type_Intra_Inv_Set1 [ intra_tx_type ] <br> else <br>   TxType = Tx_Type_Intra_Inv_Set2[ intra_tx_type ] <br> if ((TxType == DCT_DCT || TxType == ADST_ADST) && <br> !(use_filter_intra) && <br> (y_mode < PAETH_PRED) && !(tx_depth)) { <br>   stx_type <br>   if (stx_type) <br>     stx_set <br> } <br> ... <br> } else { <br> TxType = DCT_DCT | <br><br><br><br><br><br><br><br><br><br><br>S( ) <br><br>S( ) |

| | Type |
|---|---|
| if (!(use_filter_intra) && (y_mode < PAETH_PRED) && <br> !(tx_depth)) { <br>   stx_type <br>   if (stx_type) <br>     stx_set <br> } <br> ... <br> } | <br><br>S( ) |

Example Code 1—Transform Type Syntax

In Example Code 1, the syntax element "stx_set" is after the syntax element "stx_type." When stx_type is zero, there is no secondary transform, and stx_set is not coded. As mentioned previously, there may be 14 secondary transform sets dependent on two primary transform types, DCT_DCT and ADST_ADST. Hence, only 7 different sets need be signaled for one primary transform type, as illustrated in Example Code 2 below.

```
// Intra Secondary Transform
#define IST_SET_SIZE 14         // IST kernel set size
#if CONFIG_IST_SET_FLAG         // Number of directional groups in IST
                                   kernels
   #define IST_DIR_SIZE 7        // (IST_SET_SIZE >> 1)
#endif                           // CONFIG_IST_SET_FLAG
```

Example Code 2—Intra Secondary Transform Settings

In some embodiments, secondary transforms are enabled only for a subset of intra modes (e.g., intra modes less than PEATH_PRED). In this way, the array size for stx_transpose_mapping is set as INTRA_MODES−1. In some embodiments, a probabilistic context selected for each set is derived based on intra prediction modes, as illustrated in Example Code 3 below.

```
void av1_read_sec_tx_type( ) {
   ...
   uint8_t intra_mode = mbmi→mode;
   uint8_t stx_sex_ctx = stx_transpose_mapping [intra_mode];
   assert (stx_sex_ctx < IST_DIR_SIZE);
   uint16_t stx_set_flag =
      aom_read_symbol (r, ec_ctx→stx_set_cdf[stx_set_ctx],
         IST_DR_SIZE, ACCT_INFO("stx_sex_flag"));
   assert (stx_set_flag < IST_DIR_SIZE);
   ...
}
```

Example Code 3—Decoder Transform Context Derivation

A cumulative distribution function (CDF) may be used to represent the probability that a random variable may take a value that is less than or equal to a particular threshold value. For example, a CDF for a video codec may represent the probability times 32768 that a symbol has value less than or equal to a given level. An example CDF with an alphabet size of 7 is illustrated in Example Code 4 below.

```
static const aom_cdf_prob
default_stx_set_cdf[IST_DIR_SIZE][CDF_SIZE(IST_DIR_SIZE)] = {
   { AOM_CDF7(32744, 32748, 32756, 32760, 32764) },
   { AOM_CDF7(4, 32748, 32752, 32756, 32760, 32764) },
   { AOM_CDF7(4, 8, 32752, 32756, 32760, 32764) },
   { AOM_CDF7(4, 8, 12, 32756, 32760, 32764) },
   { AOM_CDF7(4, 8, 12, 16, 32760, 32764) },
```

```
{ AOM_CDF7(4, 8, 12, 16, 20, 32764) },
{ AOM_CDF7(4, 8, 12, 16, 20, 24) },
};
```

Example Code 4—CDF Probability Model

In Example Code 4, the IST_DIR_SIZE may be defined as 7 and the size of the CDF table is 112 bytes (e.g., 7 contexts*8 (7 symbols+1 counter)*2 (bytes per number)). For example, the number of stx_set_ctx contexts may be 7, as defined by IST_DIR_SIZE in Example Code 2 above. In some embodiments, the CDF probability model is set such that the most probable set symbol has the highest possible range size. For example, the highest possible range size of $2^{15}-6*4$ for a CDF model with a maximum range of $2^{15}$, with 6 for the number of less probable set symbols, and 4 for a minimum CDF range. A minimum range may be defined as (#define EC_MIN_PROB 4). Thus, the probability represented by the CDF model is $(2^{15}-(6*4))/2^{15}$, e.g., approximately 0.9994. Example Code 5 below illustrates an example configuration for a secondary transform.

```
#if CONFIG_IST_SET_FLAG
    if (stx_flag > 0) {
        uint8_t is_adst_adst = get_primary_tx_type(*tx_type) ==
        ADST_ADST ? 1 : 0;
        uint8_t intra_mode = mbmi->mode;
        uint8_t stx_set_ctx = stx_transpose_mapping[intra_mode];
        assert(stx_set_ctx < IST_DIR_SIZE);
        uint16_t stx_set_flag = aom_read_symbol(r,
        ec_ctx->stx_set_cdf[stx_set_ctx],
            IST_DIR_SIZE, ACCT_INFO("stx_set_flag"));
        assert(stx_set_flag < IST_DIR_SIZE);
        if (is_adst_adst) stx_set_flag += IST_DIR_SIZE;
           *tx_type |= (stx_set_flag << (4 + 2));
    }
#endif // CONFIG_IST_SET_FLAG
```

Example Code 5—Example Secondary Transform Configuration

In some embodiments, to allow mode independent selection of secondary transform set, the arithmetic coding of a set index uses uniform distribution as initial CDF (e.g., instead of skewed CDFs) such that every set index is able to be coded with similar number of bits. In some embodiments, the encoder side includes a mode decision search algorithm to find the best secondary transform set inside the search loop for the transform type.

For a transform block with secondary transform in use, the disclosed methods enable the video encoder to decide and encode the best secondary transform set index in the stx_set bitstream flag in Example Code 1, where the set index is not mode dependent.

Figures 6A, 6B:
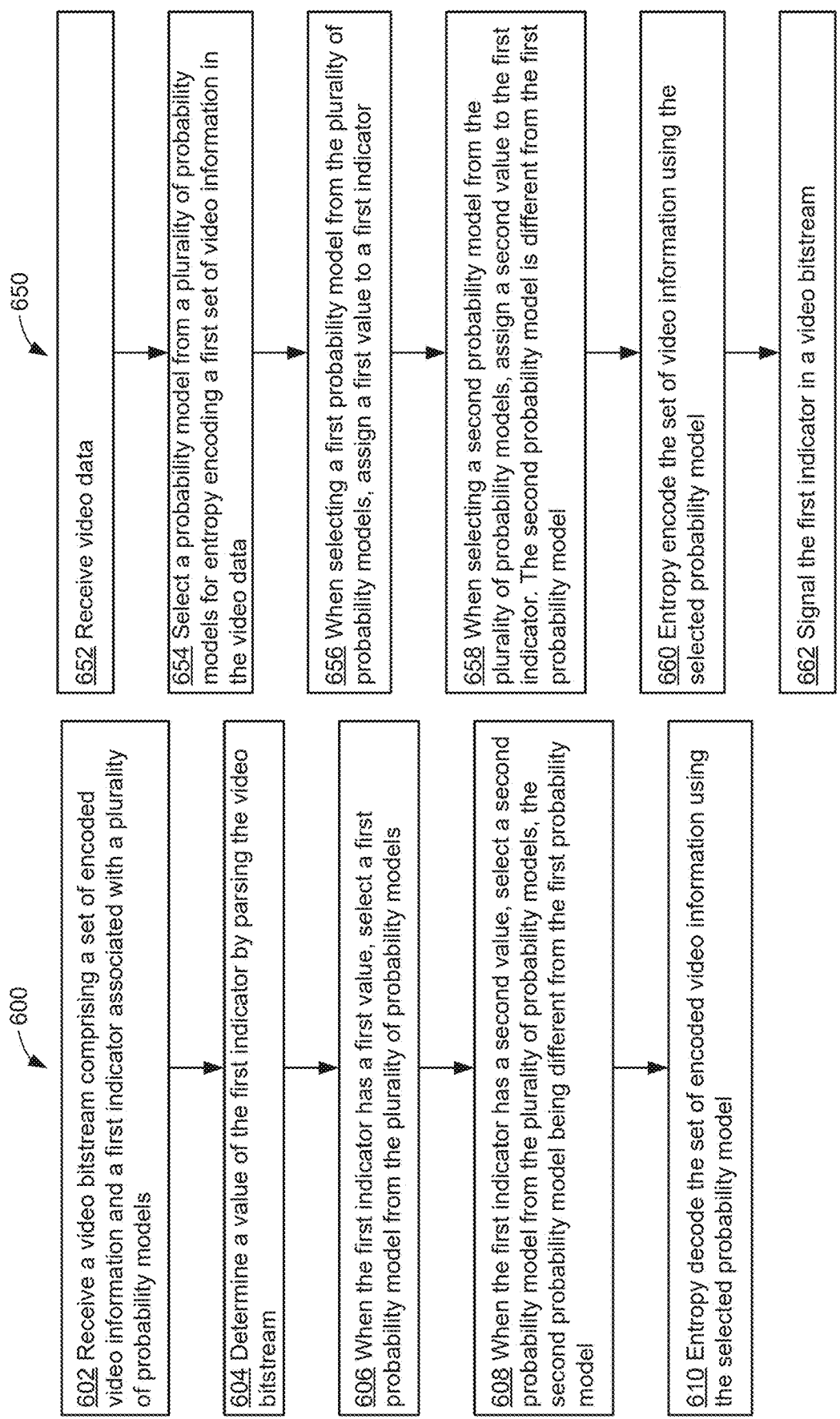
FIG. 6A illustrates an example video decoding process in accordance with some embodiments.
FIG. 6B illustrates an example video encoding process in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a set of encoded video information and a first indicator (e.g., a flag) associated with a plurality of probability models. The system determines (604) a value of the first indicator by parsing the video bitstream. When the first indicator has a first value, the system selects (606) a first probability model from the plurality of probability models. When the first indicator has a second value, the system selects (608) a second probability model from the plurality of probability models. The second probability model is different from the first probability model. The system entropy decodes (610) the set of encoded video information using the selected probability model. In some embodiments, a flag (e.g., prob_switch_flag) is received in a coded bitstream, where the flag is associated with N values. For example, when the flag value is equal to a first value, a probability model option A is used, when the flag is equal to a second value, a probability model option B is used, when the flag is equal to a third value, a probability model option C is used, and so on. Example values of N, include 2, 3, 4, . . . , 1024. In some embodiments, N is a value greater than 1024. There can be more than one such flag exists in a coded bitstream, where each flag serves for a different coding tool/syntax. In some embodiments, the flag is signaled in high-level syntax (HLS). In some embodiments, the flag is signaled in block-level.

In some embodiments, multiple flags that are assigned for switching the probability models of multiple coding tools. For example, each flag signals switching the probability model of different coding tool. Examples of coding tools whose probability models is switched include, and are not limited to, a primary transform set and/or type, and a secondary transform set and/or type. In some embodiments, there are different probability model options for multiple coding tools/syntaxes, and the switching of the probability model is applied jointly. For example, when a switch of probability model happens, it happens at the same time for multiple coding tools/syntaxes. In some embodiments, the probability model switching applies to any coding tools, such as a signaling a primary transform set and/or type, a signaling a secondary transform set and/or type.

In some embodiments, for secondary transforms, a probability model A has maximally skewed CDF default values biased to a specific intra prediction mode, while probability model B is uniform CDF default values.

In some embodiments, the switching can happen among two or more probability models. For example, the number of probability models that can be switched by the prob_switch_flag flag can be as small as 2, as high as 1024, or even higher than 1024.

In some embodiments, at the encoder side, the determination of the value of prob_switch_flag depends on whether an RDO search is performed for specific coding tool. In some embodiments, if the RDO search is not performed, then a transform set and/or type is implicitly chosen by intra prediction modes. For example, the CDFs to code such information may be designed so that the probability of the derived symbol is maximally close to 1.0 to spend as small as possible number of bits. In some embodiments, if the RDO search is performed, the search finds the best candidate in terms of coding efficiency.

In some embodiments, probability model options A, B, C, etc. correspond to initial or default probability models for multiple syntax elements. In some embodiments, probability model options A, B, C etc. correspond to updated models for multiple syntax elements.

In some embodiments, when prob_switch_flag is signaled at a block level, the probability model options A, B, C etc. correspond to models stored during various stages of decoding the neighboring blocks.

In some embodiments, at the encoder side, the switching of probability models is determined by the selection of presets, which controls different encoding speed settings.

In some embodiments, a flag value for prob_switch_flag is implicitly derive depending on coded information. For example, the flag is associated with N values but not signaled. When the flag is equal to a first value, the probability model option A is used, when the flag is equal to a second value, the probability model option B is used, when the flag is equal to a third value, the probability model option C is used, and so on. Example values of N include 2, 3, 4, . . . , 1024. In some embodiments, N is larger than 1024. In some embodiments, the coded information includes frame type, temporal layer, frame/slice type, picture resolution, tile size, temporal id, order hint, block size, a block shape, a quantization parameter, a number of coded symbols, and/or a coordinate of the block.

In some embodiments, multiple flags are assigned for switching the probability models of multiple coding tools. For example, each flag signals switching the probability model of different coding tool. In some embodiments, there may be different probability model options for multiple coding tools/syntaxes. The switching of the probability model may be applied jointly. That is, when a switch of probability model happens, it happens at the same time for multiple coding tools/syntaxes. In some embodiments, at the encoder side, the switching of probability model is determined by the selection of presets, which control different encoding speed settings.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data. The system selects (654) a probability model from a plurality of probability models for entropy encoding a first set of video information in the video data. The system, when selecting a first probability model from the plurality of probability models, assigns (656) a first value to a first indicator. The system, when selecting a second probability model from the plurality of probability models, assigns (658) a second value to the first indicator. The second probability model is different from the first probability model. The system entropy encodes (660) the set of video information using the selected probability model. The system signals (662) the first indicator in a video bitstream. As described previously, the encoding process may mirror the decoding processes described herein (e.g., selecting probability models). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream comprising a set of encoded video information and a first indicator (e.g., a flag) associated with a plurality of probability models; (ii) determining a value of the first indicator by parsing the video bitstream; (iii) when the first indicator has a first value, selecting a first probability model from the plurality of probability models; (iv) when the first indicator has a second value, selecting a second probability model from the plurality of probability models, the second probability model being different from the first probability model; and (v) entropy decoding the set of encoded video information using the selected probability model. For example, a flag (e.g., denoted as prob_switch_flag) is received in a coded bitstream, where the flag is associated with N values. When the flag value is equal to a first value, a probability model option A is used, when the flag is equal to a second value, a probability model option B is used, when the flag is equal to a third value, a probability model option C is used, and so on. Example values of N include 2, 3, 4, through 1024 (e.g., and can be higher than 1024 in some implementations). In some embodiments, the first probability model is selected in accordance with a determination that the first indicator has a first value, and the second probability model is selected in accordance with a determination that the first indicator has a second value.

(A2) In some embodiments of A1, the first indicator corresponds to a first set of decoding operations. The set of encoded video information is used in the first set of decoding operations. The method further includes (i) parsing a value of a second indicator from the video bitstream, wherein the second indicator corresponds to a second set of decoding operations different than the first set; (ii) when the second indicator has a first value, identifying a third probability model from the plurality of probability models; (iii) when the second indicator has a second value, identifying a fourth probability model from the plurality of probability models, the fourth probability model being different than the third probability model; and (iv) entropy decoding a second set of encoded video information using the identified probability model, wherein the second set of encoded video information is used in the second set of decoding operations. For example, there can be more than one such flag in a coded bitstream, where each flag serves for a different coding tool/syntax. As an example, there are multiple flags that are assigned for switching the probability models of multiple coding tools, where each flag signals switching the probability model of different coding tool.

(A3) In some embodiments of A2, the first set of decoding operations comprise a primary transform operation. The second set of decoding operations comprise a secondary transform operation. Examples of coding tools whose probability models is switched includes a primary transform set and/or type, and a secondary transform set and/or type. In some embodiments, the probability model switching method applies to any coding tool, such as signaling a primary transform set and/or type and signaling a secondary transform set and/or type. For example, for secondary transforms, a first probability model has maximally skewed CDF default values biased to a specific intra prediction mode (e.g., uses minimal bit codes), while a second probability model has uniform CDF default values.

(A4) In some embodiments of any of A1-A3, when the first indicator has the first value, the first probability model is selected for a first set of decoding operations and a third probability model is selected for a second set of decoding operations. When the first indicator has a second value, the second probability model is selected for the first set of decoding operations and a fourth probability model is selected for the second set of decoding operations. For example, there may be different probability model options for multiple coding tools/syntaxes, and the switching of the probability model may be applied jointly. That is, when a switch of probability model happens, it happens at the same time for multiple coding tools/syntaxes. As an example, switching can happen among two or more probability models. In one example, the number of probability models that can be switched by the prob_switch_flag flag may be as low as 2 or as high as 1024 (or higher).

(A5) In some embodiments of any of A1-A4, the first probability model has a set of a maximally-skewed CDF default values biased for a particular intra prediction mode. The second probability model has a set of a uniform CDF default values. For example, for secondary transforms, probability model A has maximally skewed CDF default values biased to a specific intra prediction mode, while probability model B is uniform CDF default values.

(A6) In some embodiments of any of A1-A5, the value of the first indicator is based on whether an RDO-based search is used. For example, at the encoder side, the determination of the value of prob_switch_flag depends on whether the RDO-based search is performed for specific coding tool.

(A7) In some embodiments of A6, when an RDO-based search is not used, the first indicator is signaled with the first value corresponding to a maximally-skewed set of CDF values for a particular intra prediction mode. When the RDO-based search is used, the first indicator is signaled with a respective value based on the RDO-based search. For example, if the RDO search is not performed, then a transform set and/or type can be implicitly chosen by intra prediction modes. The CDFs to code such information is designed so that the probability of derived symbol is maximally close to 1.0 to spend as small as possible number of bits. As another example, if said RDO search is performed, the search finds the best candidate in terms of coding efficiency.

(A8) In some embodiments of any of A1-A7, the value of the first indicator is based on selection of one or more presets related to one or more encoding speed settings. For example, at the encoder side, the switching of probability model may be determined by the selection of presets, which controls different encoding speed settings.

(A9) In some embodiments of any of A1-A8, the plurality of probability models comprise a set of default probability models. For example, probability model options A, B, C, etc. may correspond to initial or default probability models for multiple syntax elements.

(A10) In some embodiments of any of A1-A9, the plurality of probability models comprise a set of updated probability models. For example, probability model options A, B, C etc. may correspond to updated models for multiple syntax elements.

(A11) In some embodiments of A10, the first indicator is signaled at a block level for a current block. The plurality of probability models comprise models used for decoding one or more neighboring blocks for the current block. For example, when prob_switch_flag is signaled at block level, the probability model options A, B, C etc. may correspond to models stored during various stages of decoding the neighboring blocks.

(A12) In some embodiments of any of A1-A10, the first indicator is signaled in high-level syntax (HLS) of the video bitstream. For example, the flag is signaled in HLS.

(A13) In some embodiments of any of A1-A10, the first indicator is signaled at a block level in the video bitstream. For example, the flag is signaled at a super block level, a coding unit level, or a transform unit level.

(B1) In another aspect, some embodiments include a method (e.g., the method 650) of video encoding. In some embodiments, the method is performed at a computing system having memory and one or more processors. The method includes: (i) receiving video data; (ii) selecting a probability model from a plurality of probability models for entropy encoding a first set of video information in the video data; (iii) when selecting a first probability model from the plurality of probability models, assigning a first value to a first indicator; (iv) when selecting a second probability model from the plurality of probability models, assigning a second value to the first indicator, wherein the second probability model is different from the first probability model; (v) entropy encoding the set of video information using the selected probability model; and (vi) signaling the first indicator in a video bitstream.

(B2) In some embodiments of B1, the method further includes signaling the entropy-encoded set of video information via the video bitstream.

(B3) In some embodiments of B1 or B2, the probability model is selected based on whether an RDO search is used for the first set of video information.

(B4) In some embodiments of B3, when the RDO search is not used for the first set of video information, the probability model is selected based on an intra prediction mode for the first set of video information.

(B5) In some embodiments of B3 or B4, when the RDO search is used for the first set of video information, the probability model is selected based on a result of the RDO search.

(B6) In some embodiments of any of B1-B5, the probability model is selected based on an encoder speed setting.

(C1) In another aspect, some embodiments include a method of visual media data processing. In some embodiments, the method is performed at a computing system having memory and one or more processors. The method includes: (i) obtaining a source video sequence comprising a plurality of pictures; and (ii) performing a conversion between the source video sequence and a bitstream of visual media data, wherein the bitstream comprises: (a) an entropy-encoded set of video information corresponding to the plurality of pictures; and (b) a first indicator indicating which of a plurality of probability models is to be used to entropy decode the entropy-encoded set of video information.

(D1) In another aspect, some embodiments include a method of video decoding. In some embodiments, the method is performed at a computing system having memory and one or more processors. The method includes: (i) receiving a video bitstream comprising a set of encoded video information; (ii) deriving a value of the first indicator based on coded information; (iii) when the first indicator has a first value, selecting a first probability model from the plurality of probability models; (iv) when the first indicator has a second value, selecting a second probability model from the plurality of probability models, the second probability model being different than the first probability model; and (v) entropy decoding the set of encoded video information using the selected probability model. For example, a flag value (e.g., denoted prob_switch_flag) is implicitly derived depending on coded information. The flag is associated with N values but not signaled. When the flag is equal to a first value, the probability model option A is used, when the flag is equal to a second value, the probability model option B is used, when the flag is equal to a third value, the probability model option C is used, and so on. Example values of N include but not limited to 2, 3, 4, ..., 1024 and can be even higher than 1024 as well.

(D2) In some embodiments of D1, the coded information includes one or more of: a frame type; a temporal layer; a slice type; a picture resolution; a tile size; a temporal identifier; an order hint; a block size of a current block; a block shape of the current block; a quantization parameter; a number of coded symbols; and a coordinate of the current block. Examples of coded information that is available to both encoder and decoder includes frame type, temporal layer, frame/slice type, picture resolution, tile size, temporal id, order hint, block size, a block shape, a quantization parameter, a number of coded symbols, a coordinate of the block, and etc.

(D3) In some embodiments of D1 or D2, the first indicator corresponds to a first set of decoding operations. The set of encoded video information is used in the first set of decoding operations. The method further includes (i) deriving a value of a second indicator based on second coded information, wherein the second indicator corresponds to a second set of decoding operations different than the first set; (ii) when the second indicator has a first value, identifying a third probability model from the plurality of probability models; (iii) when the second indicator has a second value, identifying a fourth probability model from the plurality of probability models, the fourth probability model being different than the third probability model; and (iv) entropy decoding a second set of encoded video information using the identified probability model, wherein the second set of encoded video information is used in the second set of decoding operations. For example, there are multiple such flags that are assigned for switching the probability models of multiple coding tools, where each flag signals switching the probability model of different coding tool.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13, B1-B6, C1, and D1-D3 above). In another aspect, some embodiments include a non-transitory computer-readable storage medium storing one or more sets of instructions for execution by control circuitry of a computing system, the set(s) of instructions including instructions for performing any of the methods described herein (e.g., A1-A13, B1-B6, C1, and D1-D3 above).

Unless otherwise specified, any of the syntax elements described herein may be HLS. As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a set of encoded video information and a first indicator associated with a plurality of probability models;
   determining a value of the first indicator by parsing the video bitstream;
   when the first indicator has a first value, selecting a first probability model from the plurality of probability models, wherein the first probability model has a set of a maximally-skewed cumulative density function (CDF) default values biased for a particular intra prediction mode;
   when the first indicator has a second value, selecting a second probability model from the plurality of probability models, the second probability model being different from the first probability model, wherein the second probability model has a set of a uniform CDF default values; and entropy decoding the set of encoded video information using the selected probability model.

2. The method of claim 1, wherein the first indicator corresponds to a first set of decoding operations, and the set of encoded video information is used in the first set of decoding operations; and the method further comprises:
parsing a value of a second indicator from the video bitstream, wherein the second indicator corresponds to a second set of decoding operations different than the first set;
when the second indicator has a first value, identifying a third probability model from the plurality of probability models;
when the second indicator has a second value, identifying a fourth probability model from the plurality of probability models, the fourth probability model being different than the third probability model; and
entropy decoding a second set of encoded video information using the identified probability model, wherein the second set of encoded video information is used in the second set of decoding operations.

3. The method of claim 2, wherein the first set of decoding operations comprise a primary transform operation, and wherein the second set of decoding operations comprise a secondary transform operation.

4. The method of claim 1, wherein:
when the first indicator has the first value, the first probability model is selected for a first set of decoding operations and a third probability model is selected for a second set of decoding operations;
when the first indicator has a second value, the second probability model is selected for the first set of decoding operations and a fourth probability model is selected for the second set of decoding operations.

5. The method of claim 1, wherein the value of the first indicator is based on whether a rate distortion optimization (RDO)-based search is used.

6. The method of claim 5, wherein:
when an RDO-based search is not used, the first indicator is signaled with the first value corresponding to a maximally-skewed set of CDF values for a particular intra prediction mode; and
when the RDO-based search is used, the first indicator is signaled with a respective value based on the RDO-based search.

7. The method of claim 1, wherein the value of the first indicator is based on selection of one or more presets related to one or more encoding speed settings.

8. The method of claim 1, wherein the plurality of probability models comprise a set of default probability models.

9. The method of claim 1, wherein the plurality of probability models comprise a set of updated probability models.

10. The method of claim 9, wherein the first indicator is signaled at a block level for a current block, and wherein the plurality of probability models comprise models used for decoding one or more neighboring blocks for the current block.

11. The method of claim 1, wherein the first indicator is signaled in high-level syntax of the video bitstream.

12. The method of claim 1, wherein the first indicator is signaled at a block level in the video bitstream.

13. A computing system, comprising:
control circuitry;
memory; and
one or more sets of instructions stored in the memory and configured for execution by the control circuitry, the one or more sets of instructions comprising instructions for:
receiving video data;
selecting a probability model from a plurality of probability models for entropy encoding a first set of video information in the video data;
when selecting a first probability model from the plurality of probability models, assigning a first value to a first indicator, wherein the first probability model has a set of a maximally-skewed cumulative density function (CDF) default values biased for a particular intra prediction mode;
when selecting a second probability model from the plurality of probability models, assigning a second value to the first indicator, wherein the second probability model is different from the first probability model, and wherein the second probability model has a set of a uniform CDF default values;
entropy encoding the set of video information using the selected probability model; and
signaling the first indicator in a video bitstream.

14. The computing system of claim 13, further comprising signaling the entropy-encoded set of video information via the video bitstream.

15. The computing system of claim 13, wherein the probability model is selected based on whether a rate distortion optimization (RDO)-based search is used for the first set of video information.

16. The computing system of claim 15, wherein, when the RDO-based search is not used for the first set of video information, the probability model is selected based on an intra prediction mode for the first set of video information.

17. The computing system of claim 15, wherein, when the RDO-based search is used for the first set of video information, the probability model is selected based on a result of the RDO-based search.

18. The computing system of claim 13, wherein the probability model is selected based on an encoder speed setting.

19. A non-transitory computer-readable storage medium storing a video bitstream that is generated by a video encoding method, the video bitstream comprising:
an entropy-encoded set of video information corresponding to a plurality of pictures of video data; and
a first indicator indicating which of a plurality of probability models is to be used to entropy decode the entropy-encoded set of video information, wherein the plurality of probability models include a first probability model having a set of a maximally-skewed cumulative density function (CDF) default values biased for a particular intra prediction mode and a second probability model having a set of a uniform CDF default values.

20. The non-transitory computer-readable storage medium of claim 19, wherein the first indicator corresponds to a first set of decoding operations, and wherein the video bitstream further comprises a second indicator corresponding to a second set of decoding operations different than the first set of decoding operations.

* * * * *